United States Patent [19]
Crane

[11] Patent Number: 4,808,774
[45] Date of Patent: Feb. 28, 1989

[54] STRAIN RELIEF DEVICE

[75] Inventor: Robert A. Crane, Windham, Me.

[73] Assignee: GTE Products Corporation, Stamford, Conn.

[21] Appl. No.: 109,637

[22] Filed: Oct. 19, 1987

[51] Int. Cl.$^4$ .......................... H02G 3/18; H02G 3/22
[52] U.S. Cl. ................... 174/135; 174/65 R; 174/153 G; 174/156; 248/56; 285/396; 439/445
[58] Field of Search ................... 174/65 R, 65 G, 135, 174/152 G, 153 G, 155, 156, 167; 16/2; 248/56; 285/42, 159, 161, 205, 361, 362, 377, 396, 402; 403/195; 439/445, 447, 449, 465, 467, 470, 546–550, 562, 563, 565, 572

[56] References Cited

U.S. PATENT DOCUMENTS

| | | | |
|---|---|---|---|
| 2,945,085 | 7/1960 | Billups | 248/56 X |
| 3,076,655 | 2/1963 | Washburn, Jr. | 174/65 R X |

FOREIGN PATENT DOCUMENTS

| | | | |
|---|---|---|---|
| 653256 | 11/1928 | France | 285/396 |
| 48348 | 7/1964 | Poland | 174/153 G |
| 372361 | 11/1963 | Switzerland | 439/445 |
| 262532 | 12/1926 | United Kingdom | 174/153 G |
| 530152 | 12/1940 | United Kingdom | 285/377 |

Primary Examiner—Laramie E. Askin
Attorney, Agent, or Firm—James Theodosopoulos

[57] ABSTRACT

A strain relief device is disclosed which is adapted to receive wires which extend into an aperture of a service box. The device comprises a structure formed of a cylindrical segment and a conical segment. The cylindrical segment is disposed at the base of the conical segment and each of the segments is hollow. At least one section line, and preferably two, is disposed through the side wall of the structure. The section line extends from the top of the conical segment to the bottom of the cylindrical segment, whereby the segments are split into two sections. An abutment is disposed on the structure which is arranged to urge against the perimeter of the aperture in the service box. The two sections are joined together with a collar which is disposed around the cylindrical segment and co-acts with the abutment to hold the device in the aperture.

4 Claims, 3 Drawing Sheets

STRAIN RELIEF DEVICE

FIELD OF THE INVENTION

The present invention relates to a device to aid in installing a wire cable in a service box, and more particularly, to a device which will accept a variety of cables of different diameters and fixedly secure any of them in the service box. The invention especially relates to a device used to dispose telephone wire cable in telephone service boxes.

SUMMARY OF THE PRIOR ART

In the past, many devices have been used to install cables through apertures in service boxes. Such devices have included nuts with flanges that are tightened into a hole in the service box. These devices frequently have adjustable clamps that engage the cable to fixedly secure them in the box and prevent accidental removal. Other devices have included connectors that are threaded around the cable and then tightened after the devices have been inserted into the hole. Also, the art has used plastic devices that surround the cable and serve as wedges between the cable and the hole.

SUMMARY OF THE INVENTION

According to the present invention, I have devised a strain relief device that can be used with either new cables or those that have already been placed in service. The strain relief device of the present invention can be installed even though the cables are already connected to terminals in the service box. Thus, the device of the present invention can be used when the installer is working with either new or existing cables being installed in new or existing service boxes.

The strain relief device, according to the present invention, is adapted to receive cables which extend into an aperture in the service box. The device is a structure formed of a cylindrical segment and a conical segment both of which are hollow, the cylindrical segment being disposed on and integrally attached to the base of the conical segment. The wall thickness of the conical segment is substantially uniform throughout its entire length. At least one section line, and preferably two, is disposed through the side walls of the device. The section line extends parallel or substantially parallel to the axis of the device, or at least is arranged to bifurcate the device into two sections. A rigid abutment is integrally disposed around the cylindrical segment of the strain relief device and is arranged to urge against the perimeter of the aperture in the service box into which the cable passes. A collar is disposed about the cylindrical segment of the strain relief device and preferably is formed of a pair of semi-circular members which snap together and engage the cylindrical segment to hold the device together. In another embodiment, the semi-circular members forming the collar can be bound together with a conventional cable tie.

In a preferred embodiment, the apex of the conical section is arranged so that it can be cut off to expose an aperture which is identical in diameter to the outside diameter of the cable that is disposed in it. With cables having small outside diameters, only the tip of the conical segment needs to be cut off and for larger diameter cables, the cut may be made nearer to the base of the conical segment thereby providing a larger opening for the cable.

Preferably, a series of rings are disposed on the conical segment and spaced so that the installer will know where to cut the conical segment to provide an opening which is appropriate to the outer diameter of the cable being installed. These rings also provide a location to place a conventional cable tie which will secure the two sections of the strain relief device together. Moreover, indicia can be imprinted upon the spaces between the ribs to show the points at which the conical segment can be cut to provide a specific inside diameter.

DESCRIPTION OF THE PREFERRED EMBODIMENTS

Figure 1:
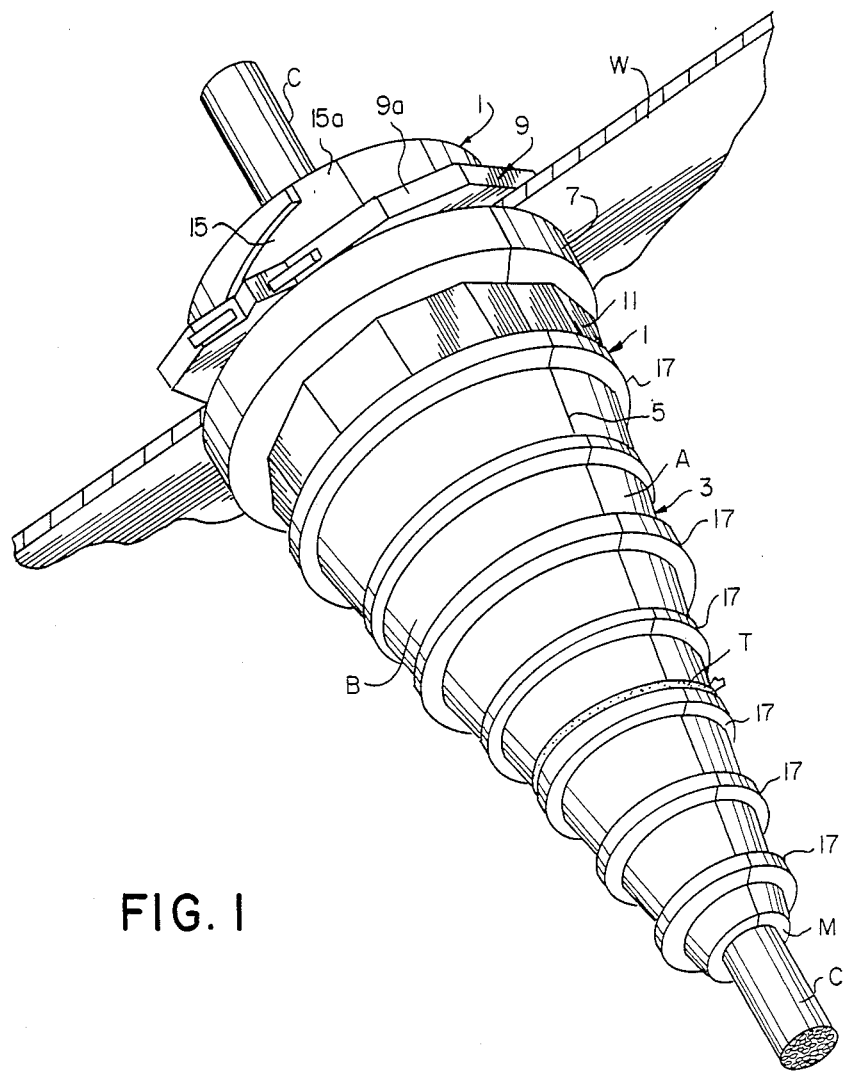
FIG. 1 is a perspective view showing an embodiment of the strain relief device according to the present invention. The device is shown as having a cable disposed within it.

Referring now to FIG. 1, the device of the present invention includes a structure formed of a cylindrical segment 1 and a conical segment 3. A section line 5 splits the device into at least two sections A and B. In one embodiment the sections A and B can be joined by a so-called "living hinge". In the preferred embodiment, however, a second section line (not shown in FIG. 1) splits the device into two distinct sections so that the device can be laid apart easily, although one section line will in many cases accomplish the same task.

Figure 3:
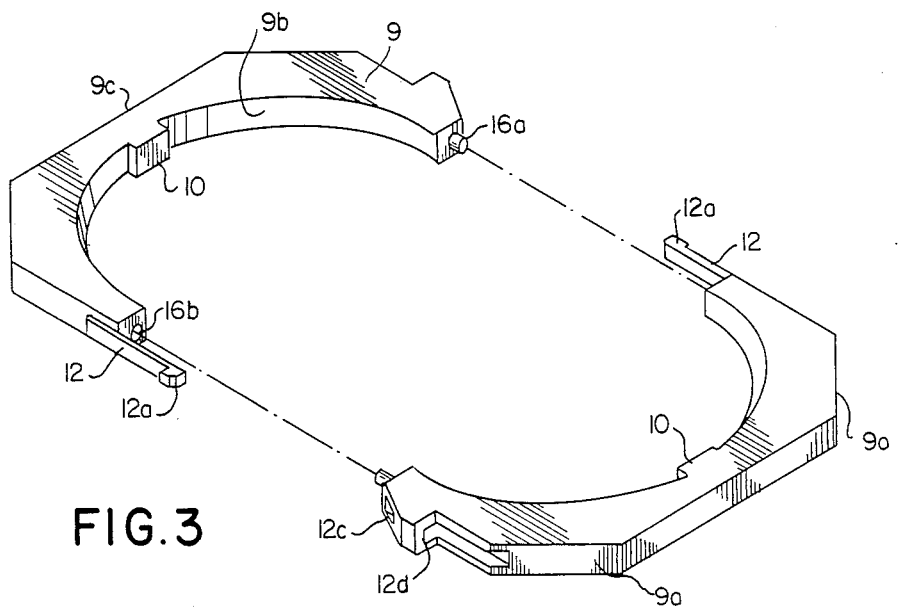
FIG. 3 is an exploded perspective view of the collar that is used in the preferred embodiment to secure the two sections of the strain relief device together.
Figure 4:
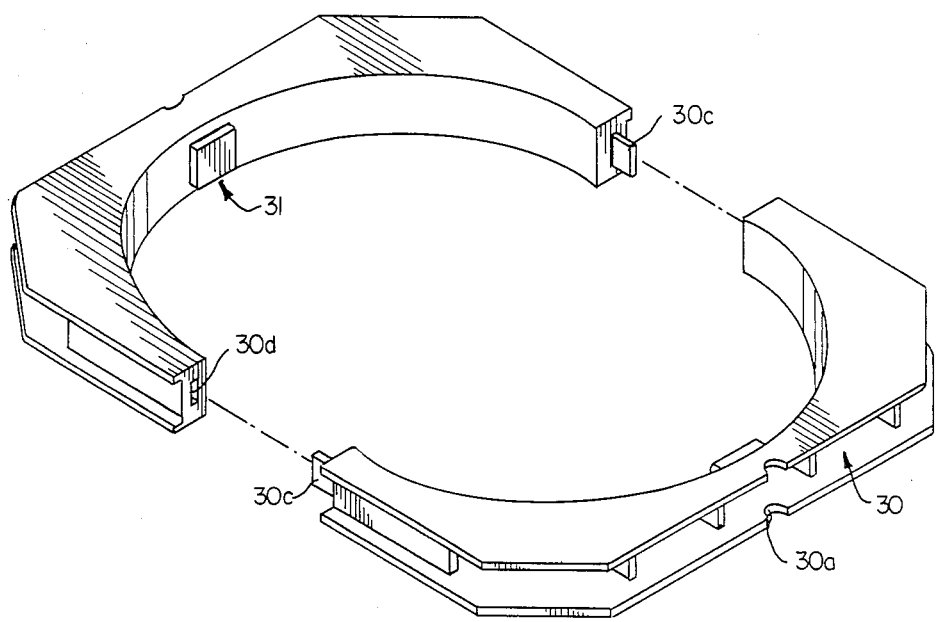
FIG. 4 is an exploded view showing an alternative embodiment of the collar shown in FIG. 3.

Both the cylindrical segment 1 and the conical segment 3 are hollow, and at least the conical segment 1 is of a substantially uniform wall thickness. An abutment 7 is integrally disposed around the cylindrical segment 1, as a molded portion thereof. The abutment 7 urges against a wall W by means of a collar 9 that is in the shape of a ring. The collar 9 encircles the two sections of the cylindrical portion. Preferably, the collar 9 is formed of two portions that snap fit together (as shown in FIGS. 3 or 4) and when so snap fitted, will detachably secure the sections A and B together.

In the preferred embodiment, a peripherally molded set of flats 11 is provided in the cylindrical segment 1 to enable an installer to grasp the device with a wrench or by hand and keep it in place as it is being worked on. The flats 11 are preferably disposed immediately adjacent the abutment 7 for convenience of the installer.

The conical segment 3 disposed at the end of the cylindrical segment 1 has a series of peripheral ribs 17 that extend outwardly from the wall. A series of indicia, such as 1.5, 1.25, 1.00, 0.75, 0.5, and 0.25 are disposed on the outside of the conical segment 3 and indicate (in inches) the mouth diameter M (that is, the inner diameter of the opening of the conical segment 3 at that point). The indicia indicate the thickness of the cable C that can be fitted in the mouth M. Thus, the installer needs only to identify the cable diameter and cut off a portion of the conical segment 3 at a location near a rib 17 which corresponds to the cable diameter, thereby securing a firm engagement between the cable C and the strain relief device.

The two sections A and B can then be fitted together around the cable C. In the illustrated embodiment, the cable C is already threaded through the wall W and a conventional cable tie T can be secured around the sections A and B. When completed, the collar 9 can be snapped in place when the abutment 7 is urged against the wall W. A wrench may be used to engage the flats 9a that are formed around the periphery of the collar 9, whereby the collar 9 can be twisted and engage the wall W and tighten the device in place, as will be further explained later.

Figure 2:
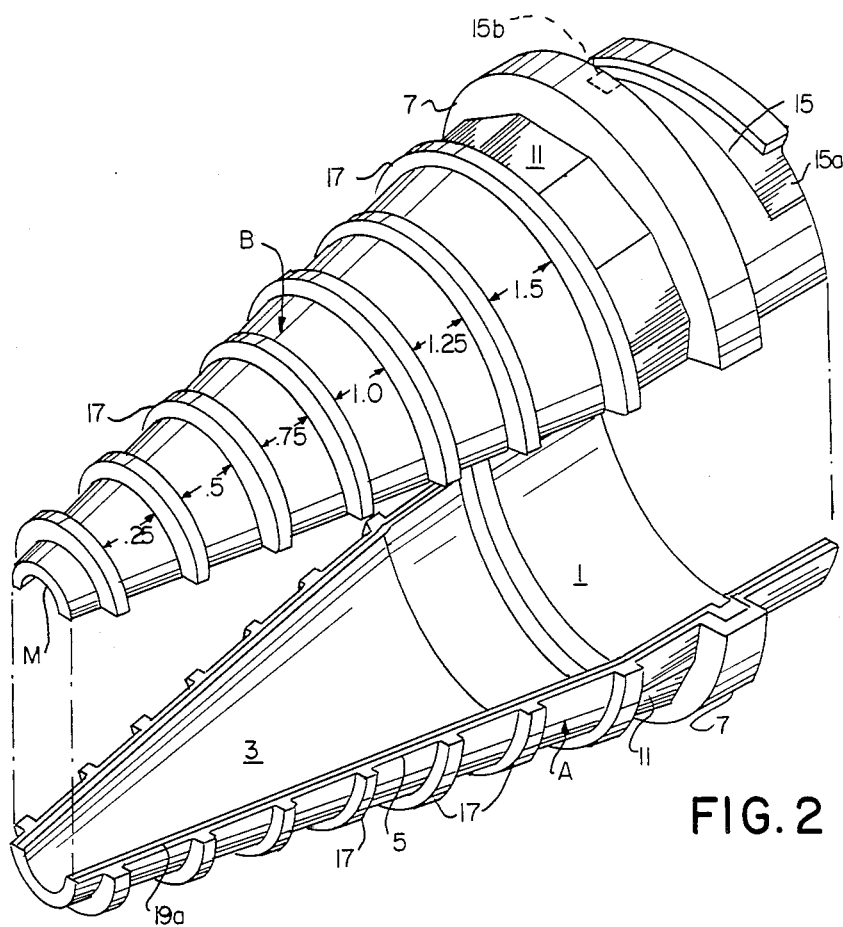
FIG. 2 is an exploded perspective view showing the strain relief device according to the present invention opened to receive a cable.

Referring now to FIGS. 2 and 3, the two sections A and B are shown spaced from each other and arranged to receive a cable. As can be seen, the side wall of the conical segment 3 is fairly uniform in thickness from the apex (at M) to the base where the conical segment 3 meets the cylindrical segment 1. A small ridge 19a is disposed on the section line 5 (with a corresponding groove on the opposite side of the section line) to aid in aligning the sections A and B and securing a rigid interplacement.

A channel 15 is disposed on the outside of the cylindrical segment. The channel 15 is spiral in shape with one end of the channel terminating in an entryway 15a and the other end terminating in a step 15b. Identical channels of the spiral shape are disposed on each of the sections A and B. The channel 15 is arranged to receive a land 10 that is disposed on the inner wall of the collar 9. The land 10 is arranged to fit into the entryway 15a and upon twisting the collar 9 relative to the cylindrical segment 1, it will rotate gradually until it engages the wall W (shown in FIG. 1). Upon a final twist, the land 10 will enter the step 15b whereby it will be seated.

To allow for the use of a wrench, the collar 9 has flats 9a and 9c that will enable the collar 9 to be torqued against the wall W. The two channels 15 (one on each section A and B) together with two lands 10, are offset from each by 180°.

As shown in FIG. 3, the inner radius 9b of the collar 9 corresponds to the outer diameter of the cylindrical segment 1, whereby the collar 9 will freely turn around the cylindrical segment 1. In the preferred embodiment, collar 9 is formed of two mating halves. A locking arm 12 with a locking step 12a fits into a channel lock 12c and the channel lock 12d to fasten the halves together. A pair of pins 16a fit into receiving holes 16b formed on the mating faces of a collar 9.

Alternatively, as shown in FIG. 4, the two halves of the collar 31 can be made without the locking arm and step shown in FIG. 3, but rather with a groove 30 around the perimeter of both halves. A pair of pins 30c fit into receiving holes 30d formed on the mating faces of the collar 31. A conventional cable tie (not shown) can then be disposed in the groove 30 to fasten the two halves together by passing the cable tie around both halves and tightening. With this embodiment, an opening 30a is preferably provided to allow the cable tie to be cut when it is necessary to remove the strain relief device from the servie box in which it is installed.

It is apparent that modifications and changes can be made within the spirit and scope of the present invention, but it is my intention, however, only to be limited by the scope of the following claims.

As my invention, I claim:

1. A strain relief device adapted to receive wires which extend into an aperture of a service box, said device comprising:
   a molded plastic structure formed of a cylindrical segment and a conical segment, said cylindrical segment being disposed at the base of said conical segment, each of said segments being hollow;
   abutment means disposed on said structure, said abutment means arranged to urge against the perimeter of the aperture in said service box;
   at least one section line disposed through a sidewall of said structure, said section line extending from the top of said conical segment to the bottom of said cylindrical segment and through said abutment means, whereby said member is split into at least two sections;
   a molded plastic collar joining said sections together, said collar being disposed around said structure and co-acting with said abutment means to hold said device in said aperture, said collar being formed of two portions, the insides of said portions being adapted to urge against said cylindrical segment of said structure;
   a land molded on the inner of said collar;
   a channel molded on the outer side of said cylindrical segment, said channel having a spiral configuration;
   a step molded on the end of said channel, said land being arranged to be disposed in said channel, whereby when said land is disposed in said channel and said collar is twisted, the land will enter said step, and the two sections of said structure are urged together and locked with the yielding action of the molded plastic.

2. The strain relief device according to claim 1 wherein there are at least two section lines disposed through the sidewall of said structure whereby said device can be opened into two separable sections.

3. The strain relief device according to claim 1 further including a series of peripheral ribs disposed on the external surface of said conical segment, whereby to provide indicia for the locations of the incremental inner diameter of said conical segment and indicate points at which the strain relief device can be cut to provide predetermined inner diameters of the conical segment of said device, said ribs also forming ridges for securing a cable tie or other locking mechanisms to said structure.

4. The strain relief device according to claim 1 further including means joining the halves of the collar together.

* * * * *